3,182,863
SEED PLANTER
Roy G. Brandt and Zdenek Fabian, South Bend, Ind., assignors to Oliver Corporation, Chicago, Ill., a corporation of Delaware
Filed Mar. 29, 1963, Ser. No. 268,921
2 Claims. (Cl. 222—328)

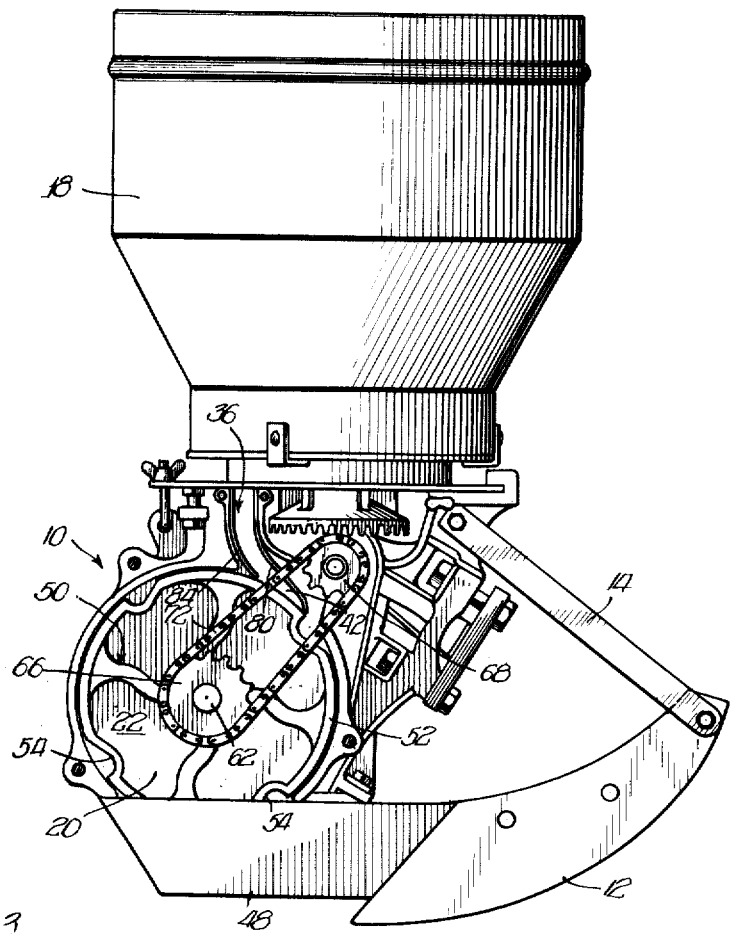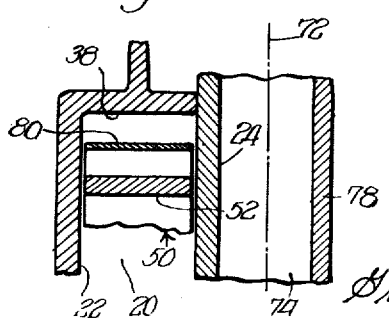

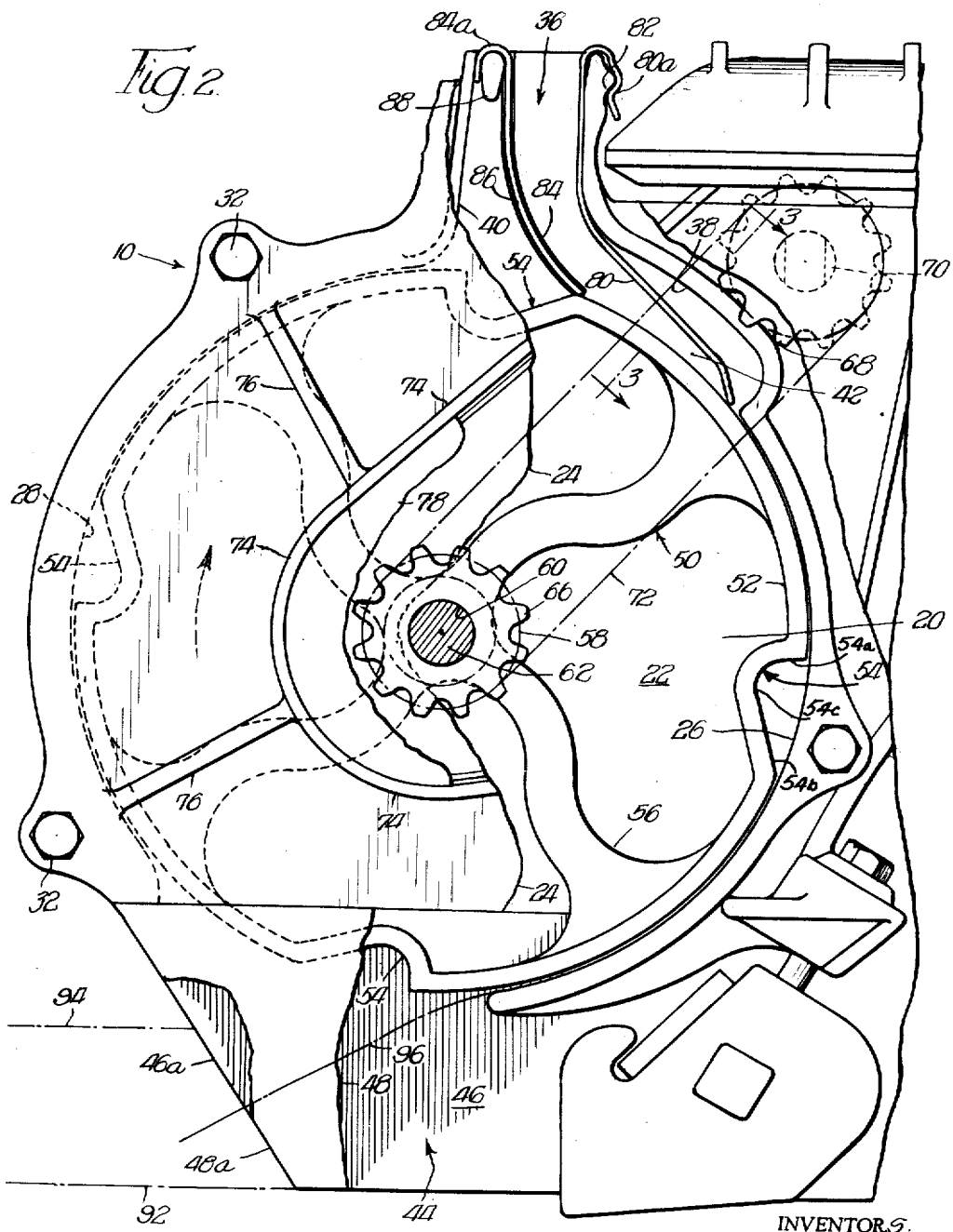

This invention relates to agricultural implements, and more particularly to a new and improved seed planter adapted to discharge seeds intermittently in clushers or hills as the planter is drawn over a field.

Seed planters have been provided for planting seeds in separate spaced-apart clusters or hills, and the advantages of planting most seeds in the manner are well known to those skilled in the art. Such planters to be completely effective must be able to collect and discharge seed in clusters of uniform size and in a manner to prevent scattering of the seeds as they contact the earth. Further, these planters should discharge substantially all the seed intermittently in distinct and separate clusters, i.e., seed should not be allowed constantly to fall or escape from the planter.

It is a primary object of the present invention to provide a seed planter having new and improved means for accurately discharging seeds intermittently in clusters as the planter is drawn over a field, whereby the seeds will be deposited in separate clusters or hills of uniform size.

It is another object of the present invention to provide in a seed planter of the type including a housing having a seed dispensing wheel rotatably mounted therein with one or more seed receiving pockets provided in the periphery of the wheel, improved means for depositing seed in the seed receiving pockets.

It is still another object of this invention to provide a seed planter associated with a furrow opening runner in a manner providing for almost immediate covering of seeds as they are discharged.

It is another object of the present invention to provide a seed planter including a housing adapted to support a seed hopper, which housing has a seed dispensing wheel rotatably mounted therein and which housing is of improved construction for positively controlling movement of seed clusters as the latter pass downwardly through the housing for discharge.

These and other objects and advantages of the invention will become apparent from the following specification wherein like numerals refer to similar parts throughout.

In the drawings:

FIG. 1 is an elevational view of one embodiment of the seed planter of this invention with certain parts of the housing of the planter being removed for better illustration of the invention;

FIG. 2 is an enlarged fragmentary view of the seed planter of FIG. 1 with certain parts of the planter being broken away for better illustration of the invention; and FIG. 3 is a section taken along line 3—3 of FIG. 2.

Now referring to the drawings, the seed planter of this invention will be seen to include a housing, generally designated 10, which housing has a forwardly extending runner 12 secured thereto and braced by means of a bar 14. A seed hopper 18 is supported on the upper portion of housing 10. It will be understood that a number of seed planters, e.g. four, may be supported on a suitable wheeled frame, such as the frame of the No. 540 Planter manufactured by Oliver Corporation of South Bend, Indiana, for being advanced forwardly (to the right as seen in FIG. 1) over the surface of a field to be planted. During forward movement of the seed planter runner 12 forms a furrow in the surface of the earth for receiving seed dispensed from housing 10. Housing 10 is in the form of a casting having a chamber 20 defined by closely spaced-apart side walls 22 and 24 and by diametrically oppositely disposed end walls 26 and 28, which end walls are vertically elongated and arcuately shaped in a direction along the heights thereof. In the embodiment of the invention shown side wall 22 and end walls 26, 28 are an integral part of the housing casting and side wall 24 is in the form of a detachable plate adapted to be bolted to the housing by a plurality of bolts 32. It will be understood that side wall 24 is co-extensive with said wall 22 for completely closing chamber 20 at the sides thereof. Housing 10 includes an inlet passageway 36 defined by the side walls and by end wall portions 38 and 40, which end wall portions connect smoothly with end walls 26 and 28, respectively. Wall portion 38 is bent or curved at the end thereof joining end wall 26 for defining a seed collecting space 42. An outlet passageway 44 is defined by side plates 46 and 48 which are an integral part of runner 12. Plates 46 and 48 are parallel with and adjoin the bottom edges of respective side walls 22 and 24 and also act as side wall portions of the housing. Outlet passageway 44 is open at its bottom and rear, which rear is defined by trailing edges 46a and 48a of respective plates 46 and 48.

A seed dispensing wheel, generally designated 50, is rotatably mounted within chamber 20 of the housing. The periphery of the wheel is defined by ring portions 52, which ring portions are separated by a plurality of equally spaced-apart seed receiving pockets 54 formed in the periphery of the wheel. Each pocket includes a generally radially extending wall portion 54a joining with an inclined wall portion 54b via an arcuate wall portion 54c which defines the base of the pocket. Since wheel 50 rotates in a clockwise direction as seen in FIG. 2, wall portions 54a and 54b may be termed the trailing wall portion and leading wall portion respectively. Seed dispensing wheel 50 further includes a number of spokes 56 integral with ring portions 52 and joining together to form a hub portion 58 having a bore 60 for non-rotatably receiving a shaft 62 upon which the wheel is mounted. Shaft 62 has opposite ends thereof journaled in the side walls of the housing by suitable means. A gear 66 is non-rotatably mounted on shaft 62 adjacent the outside of side wall 24. A drive gear 68 is mounted on one end of a drive shaft 70, which drive shaft is adapted to be rotated by a suitable power take-off from the wheeled frame supporting the seed planter. An endless drive chain 72 engageable with the teeth on gears 66 and 68 is provided for imparting rotation to gear 66 upon rotation of gear 68. It will be apparent that rotation of drive shaft 70 by means of a power take-off will result in rotation of the seed dispensing wheel. Side wall 24 includes an integral continuous wall 74 extending at a right angle therefrom and braced by a number of integral ribs 76, which wall defines with side wall 24 and a detachable cover plate 78 a sub-housing for enclosing gears 66, 68 and chain 72.

Seed dispensing wheel 50 is adapted to be rotated in a clockwise direction as seen in FIG. 2, as the seed planter is drawn over the earth in a forward direction, i.e., to the right as seen in FIG. 1. Preferably, the power take-off and drive means for wheel 50 are designed to rotate the wheel at an angular velocity correlated with the radius of the wheel to provide a linear velocity at a point on the periphery of the wheel which under certain given conditions is equal and opposite to the velocity of the seed planter. The reason for this feature will be explained hereinbelow in connection with the operation of the seed planter of this invention.

It will be noticed that the periphery of the seed dispensing wheel is closely and uniformly spaced from arcuate end walls 26 and 28. The lower end of end wall 26, which may be termed the forward end wall, curves downwardly and rearwardly and terminates just forwardly of the nadir of the seed dispensing wheel. The extent of this end of wall 26 influences the trajectory of seeds discharged in outlet passageway 44; the importance of this feature will be referred to hereinbelow. It will be understood that marginal portions of side walls 22 and 24 are closely spaced from opposite sides of wheel 50 adjacent the periphery of the latter. In effect, side walls 22 and 24 provide sides for the seed receiving pockets formed in the periphery of the seed dispensing wheel. Further, it will be understood that seed from hopper 18 is admitted to inlet passageway 36 for reception in the pockets of the seed dispensing wheel for being discharged intermittently through outlet passageway 44 in the form of clusters of hills of seeds. Chute means are provided in inlet passageway 38 for collecting seed in seed receiving space 42 and for forcing the seed into the pockets of wheel 50.

The chute means in inlet passageway 36 includes a resilient wiper arm or spring 80 having a vertically extending upper portion with the upper end thereof bent to form a clip portion 80a, which clip portion is adapted to engage or snap into a lip portion 82 integral with the casting of housing 10. Wiper arm 80, which is formed of a flat piece of spring metal having a width generally the same as the width of wheel 50 (FIG. 3), has the lower end thereof biased into sliding engagement with the periphery of the seed dispensing wheel. Wiper arm 80 is provided with sufficient resilience for forcing the lower end thereof into the pockets in wheel 50 as the pockets pass beneath the free end of the wiper arm. The chute means in inlet passageway 36 also includes a partition plate 84. Plate 84 is made out of a flat strip of metal having a width slightly greater than the distance between the inside faces of side walls 22 and 24. Each wall is provided with a groove 86 for receiving side edges of the partition plate. Partition plate 84 has a vertically extending upper portion with the upper end thereof bent to form a U-shaped portion 84a adapted to engage detachably a housing portion 88. Plate 84 is adapted to be held in inlet passageway 36 with the lower end of the plate being adapted to contact or be slightly spaced apart from the periphery of wheel 50. Partition plate 84 is prevented by recesses 86 from deflecting into the pocket 54 of the seed dispensing wheel.

Seed is admitted into inlet passageway 36 from hopper 18 where it is collected adjacent the periphery of wheel 50 between the side walls of the housing and between wiper arm 80 and plate 84. The engagement of the free end of wiper arm 80 with the periphery of wheel 50 prevents the seed collected from dropping or moving downwardly toward the space between the periphery of the wheel and arcuate end wall 26. Plate 84 prevents the collected seeds from dropping or moving downwardly toward the space between the periphery of wheel 50 and arcuate end wall 28. As plate 84 is curved along the height thereof and has its lower portion extending generally in the same direction as the lower portion of wiper arm 80, plate 84 acts to aid in directing the incoming seed into the space between the underside of the lower portion of the wiper arm and the periphery of the wheel. As one of the seed wheel pockets 54 passes beneath the chute means in inlet passageway 36, seed collected therein will drop into the advancing pocket. As seed dispensing wheel 50 continues to rotate in a clockwise direction as seen in FIG. 2, the pocket having seed therein will pass beneath the free end of the wiper arm allowing the free end of the wiper arm to enter the pocket by first passing over inclined wall portion 54b thereby forcing and compacting the seed into the arcuate portion 54c of the pocket. Continued rotation of the seed dispensing wheel results in engagement of the leading end of the next ring portion 52 with the underside of the lower portion of wiper arm 80 thereby forcing the same back to its position where the free end of the wiper arm is in sliding contact with the periphery of wheel 50. Arcuate end wall 26 in close proximity to the periphery of wheel 50 acts to prevent separation of the clusters of seed in pockets 54 as the pockets are advanced from seed collecting space 42 to the lower end of end wall 26. As pockets 54 pass beyond the lower end of wall 26 the clusters of seeds are permitted to drop downwardly and rearwardly through outlet passageway 44.

It will be noted that movement of the clusters of seeds between the inlet and outlet passageways is completely controlled by the seed dispensing wheel, i.e., there is no free fall of the clusters of seeds before they reach the outlet passageway, which outlet passageway opens at the bottom and rear thereof into the furrow formed by runner 12. In FIG. 2 the bottom and top of the furrow formed by runner 12 are indicated by lines 92 and 94, respectively. Further, the seeds are not subjected to acceleration after they have been formed in clusters in one of the seed receiving pockets and pass beyond seed receiving space 42.

As mentioned above, under certain given conditions, e.g., a given planter velocity and a given number of pockets in the seed receiving wheel, the angular velocity imparted to wheel 50 from a suitable power take-off and the radius of wheel 50 may be correlated so that the linear velocity of wheel 50 at the nadir thereof is equal and opposite to the velocity of the seed planter as the latter is advanced forwardly on the wheeled frame supporting the seed planter. When these given conditions are met, this feature provides the dropping clusters of seeds with a zero ground velocity as wheel 50 rotates in the same direction as the wheels of the frame supporting the seed planter, i.e., the direction of movement of the pockets 54 as they pass through their lowermost position or nadir is opposite to the direction of movement of the seed planter. This feature minimizes the tendency of the clusters of seeds to scatter as they contact the earth thereby providing for depositing the seeds in a furrow in separate spaced-apart clusters or hills. The scattering tendency of the seed clusters is further minimized by providing wheel 50 with a relatively large diameter thereby reducing the speed at the periphery of the wheel at a given angular velocity of the latter. Preferably, the seed dispensing wheel and driving means therefor are designed to provide zero ground velocity to the clusters of seeds for average conditions, thereby keeping ground velocity of the clusters of seeds to a minimum as the velocity of the planter, or the velocity of the seed dispensing wheel or the number of pockets on the wheel are changed for varying seed cluster spacing, for example. Manifestly, changing the velocity of the planter or seed dispensing wheel or the number of pockets on the latter varies the spacing of the spaced-apart clusters of seed.

As mentioned above, the lowermost end of forward end wall 26 terminates just forwardly of the nadir of the seed dispensing wheel. Manifestly, the extent of wall 26 determines the point at which the clusters of seed in one of the pockets 54 are free to separate from the wheel. Therefore, the extent of the lower end of the forward end wall and the velocity of wheel 50 both determine the trajectory of the clusters of seeds as they are separated from the wheel. An optimum trajectory of the seeds is indicated by line 96 in FIG. 2. This trajectory, which passes through the open rear of outlet passageway 44, is realized when wheel 50 is rotating at an angular velocity dictated by average conditions. This trajectory will vary somewhat when the speed of wheel is varied for changing the spacing of the clusters of seeds, for example.

It is important that trajectory 96 pass through the portion of the open rear of outlet passageway 44 which is disposed within the furrow formed by runner 12. It will be realized that the side walls of the furrow immediately rearwardly of trailing edges 46a and 48a collapse or close behind the runner as the same is advanced forwardly along the surface of the earth. Therefore, when clusters of seeds are discharged along trajectory 96 in outlet passageway 44, the seeds are immediately covered by the collapsing furrow as the seeds pass downwardly and rearwardly beyond the open rear of the outlet passageway. In this way the clusters of seed have little, if any, opportunity to roll and scatter.

It will be noted that trailing edges 46a and 48a of respective plates 46 and 48 are downwardly and forwardly inclined. Because of this inclination of these trailing edges, when seeds are discharged along trajectory 96 the sides of the furrow directly above the point of intersection of trajectory 96 and a plane defined by edges 46a and 48a are momentarily held apart by side plates 46 and 48. This inclination of the trailing edges of plates 46 and 48 prevents side walls of the furrow from collapsing or closing before the seeds are deposited in the furrow. By the construction just described the clusters of seeds are covered with earth from the collapsing furrow just after they have been deposited in the furrow. Therefore the clusters of seeds have little opportunity to scatter even if discharged at other than zero ground velocity. Trajectory 96 represents a preferred trajectory. Factors dictating requirements for trajectory 96, which trajectory is a function of the extent of wall 26 and the velocity of wheel 50, include, inter alia, the length of plates 46 and 48 and the shape of trailing edges 46a and 48a.

It will be apparent that wind has little, if any, effect on the dropping seed clusters as the outlet passageway opens within the furrow formed by runner 12. Substantially all of the seed discharged from the planter of this invention is discharged intermittently in separate clusters or hills as the chute means engaging the periphery of wheel 50 and the spacing between the wheel and the housing end wall and side walls prevent seed collected in space 42 from passing downwardly through the housing except by means of pockets 54. Therefore, positive control is exercised over the clusters of seeds as they are moved between the inlet passageway and outlet passageway.

While the invention has been shown in but one form it will be obvious to those skilled in the art that it is not to be so limited, but on the contrary it is susceptible of various changes and modifications without departing from the spirit and scope of the appended claims.

We claim:

1. In a seed planter of the type including a housing having a chamber defined in part by side walls and by a generally vertically elongated end wall which is arcuately shaped in a direction along the height thereof, said housing including a vertically extending inlet passageway opening into said chamber and including a wall joining the upper end of said end wall, said housing including an outlet passageway opening into said chamber adjacent the lower end of said end wall, a seed dispensing wheel mounted in said chamber between said side walls for rotation about a horizontal axis transverse to the side walls with a portion of the periphery of the wheel being closely spaced from said end wall along substantially the entire height of the latter, which wheel has at least one pocket in the periphery thereof, said pocket including a generally radially extending trailing wall portion joining with an inclined leading wall portion to define the base of the pocket, gear means for rotating said wheel in a direction for advancing said pocket along said end wall from said inlet passageway to said outlet passageway, the improvement which comprises, chute means in said inlet passageway cooperating with the periphery of said wheel for collecting seed adjacent the periphery of the same and depositing seed in said pocket as the latter is advanced beneath the chute means, said chute means including a resilient wiper arm having an upper portion which is secured to said wall of the inlet passageway, said wiper arm being bent intermediate the ends thereof and having its lower end biased against the periphery of said wheel, said arm having its lower portion extending generally in the direction of movement of said pocket as the latter descends from said inlet passageway along said end wall thereby to collect seed between the periphery of the wheel and the underside of the lower portion of the wiper arm, said wall of the inlet passageway having the portion thereof adjacent said housing end wall spaced from the periphery of said wheel thereby defining a space receiving the lower portion of the wiper arm, said wiper arm having its lower end adapted to enter said pocket by first passing over the inclined wall portion of the same thereby to force the seed beneath the lower portion of the wiper arm into the base of the pocket.

2. The improvement according to claim 1 further defined by a generally vertically extending plate in said inlet passageway in spaced relation from said wall of the latter so that incoming seed is received between said plate and said wall of the inlet passageway, said plate being curved along its height and having its lower portion extending generally in the same direction as the lower portion of said wiper arm thereby to aid in directing incoming seed into the space between the underside of the lower portion of the wiper arm and the periphery of said wheel.

References Cited by the Examiner

UNITED STATES PATENTS

| 533,252 | 1/95 | Thomas | 222—349 X |
| 2,268,725 | 1/42 | Steel | 222—328 |
| 2,496,885 | 2/50 | Milton | 222—268 X |
| 2,548,245 | 4/51 | Stevens et al. | 222—368 X |
| 2,808,181 | 10/57 | Oehler et al. | 222—368 |
| 3,048,132 | 8/62 | Morgan et al. | 222—368 X |

FOREIGN PATENTS

| 223,881 | 1/43 | Switzerland. |

RAPHAEL M. LUPO, *Primary Examiner.*